Dec. 1, 1936.
R. MORGAN
2,062,469
AUTO TOP MATERIAL
Filed June 25, 1932
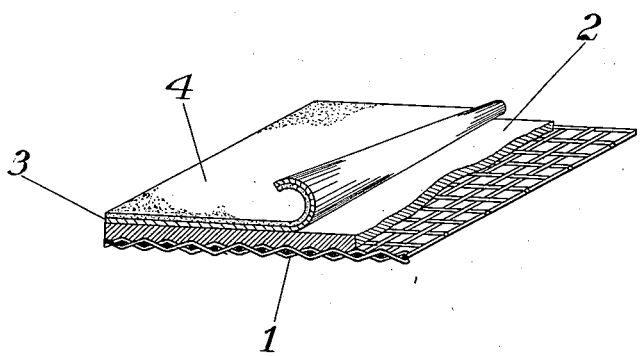
Russell Morgan INVENTORS
BY
J. M. Castle Jr.
ATTORNEY.

Patented Dec. 1, 1936

2,062,469

UNITED STATES PATENT OFFICE 2,062,469

AUTO TOP MATERIAL

Russell Morgan, Fairfield, Conn., assignor to E. I. du Pont de Nemours & Company, Wilmington, Del., a corporation of Delaware Application June 25, 1932, Serial No. 619,210

5 Claims. (Cl. 154—50)

This invention relates to auto top material, and the like, and more particularly, to auto top material of improved appearance and durability.

Prior to this time, rubber coated automobile top materials have been made consisting of the usual rubber coated fabrics, and varnished with black oil varnishes, and in some cases, colored varnishes, to improve the appearance and to protect the rubber film from the deteriorating influences of sunlight and weather. Up to the present time, black has been the only satisfactory type of varnish for this purpose. The few colored varnishes that have been tried have been either very limited as to the shades of color possible, or their durability has been so poor that they do not make a satisfactory product.

An object of the present invention is to provide flexible auto top material of improved durability and finish with a bright, highly reflecting metallic surface. A further object is to provide flexible rubberized auto top material presenting a metallic surface upon which colored varnishes or lacquers may be applied to give a colored product of excellent durability. Other objects of the invention will be apparent from the description given hereinafter.

The above objects are accomplished according to the present invention by applying to a fibrous base, usually rubber coated, a film of aluminum powder and, if desired, applying over said aluminum a surface film of a colored coating composition. It is preferred to employ the usual type of rubber coated auto top material and to apply the aluminum powder in a drying oil varnish base, preferably using an oil modified polyhydric alcohol-polybasic acid resin type varnish.

The single figure in the accompanying drawing shows a section of auto top material according to the present invention, the figure being an enlarged view to show more clearly the character of the material. Referring to the drawing, reference numeral 1 designates a fabric base, preferably a material such as drill or sheeting; 2 the usual coating of rubber applied to auto top material; 3 a varnish film containing aluminum powder, and 4 a surface film of a pigmented coating composition.

The following example is given to illustrate one method of carrying out the present invention:

*Example.*—Auto top material is made by combining two fabric sheets, such as a drill or sheeting, with rubber cement. The combined fabric is then coated with a calender coat of rubber in the usual manner, embossed if desired, and then varnished with an aluminum bronze varnish of the following composition, parts being given by weight:—

| | Parts |
|---|---|
| Phthalic anhydride | 316 |
| Glycerol | 184 |
| Linseed oil acids | 500 |
| Lead linoleate solution in mineral spirits (2.6% lead) | 87 |
| Manganese linoleate solution in mineral spirits (0.3% manganese) | 10 |
| Mineral spirits | 313 |

This varnish vehicle is prepared by resinifying in well known manner the glycerol, phthalic anhydride, and linseed oil acids to give an oil modified polyhydric alcohol-polybasic acid resin. After the reaction is complete, the mineral spirits are added, the reaction mixture is allowed to cool, and the solutions of driers added.

Immediately before the varnish is to be used, aluminum bronze powder equivalent to 25% of the total solids content of the above vehicle is stirred into the solution. After uniform distribution of the aluminum powder, the varnish is applied to the rubberized fabric, and the film of varnish is dried and the curing of the rubber coating completed simultaneously by heating the product to about 250° F. for 2½ hours. The product may be used in this condition, or if desired, it can be subsequently coated with a colored varnish or lacquer, the film of aluminum powder acting as a sealer coat between the rubber coating and the colored coating composition to prevent the surface pigmented coating composition film from being deteriorated by certain ingredients in the rubber coating.

It will be understood that the above example merely illustrates one specific method of carrying out the invention. Any suitable fibrous base material such as used for auto tops can be used in the present invention and such material may be impregnated with latex, oils, resins, or the like, or unimpregnated, and also may be coated with a rubber composition, or not, as preferred.

It is preferred to apply the aluminum powder in a drying oil varnish vehicle employing an oil modified polyhydric alcohol-polybasic acid resin, although other varnishes employing natural or synthetic resins may be used. Obviously, the polyhydric alcohol-polybasic acid resin need not be the particular one disclosed in the above example, the general type of such resin for this purpose being well known to those skilled in the art. Furthermore, the aluminum coating may be applied by means of the known types of spray guns, which take an aluminum wire, melt it, and spray it on the surface in a very finely divided state.

The film of aluminum powder presents a very attractive and efficient surface and the product may be used without further coating, or if desired, a pigmented coating composition, such as a cellulose derivative lacquer or a varnish may be applied over the aluminum powder film.

An advantage of auto top material prepared according to the present invention lies in its durability and attractive appearance. When the film of aluminum powder is used as the surface coating, the material has a highly attractive, bright, metallic finish which is particularly advantageous in reflecting the sun's rays, in contrast to the heat absorbing properties of the usual black auto top material. A further advantage of the aluminum powder surface film is that as the film weathers the surface gradually disintegrates and disappears, continually exposing a new, bright, clean surface of aluminum powder which is essentially the same in appearance as the original unexposed film. This type of finish is particularly advantageous for trucks transporting foodstuffs, or other perishable material where it is desired to avoid excess heat, the interior of an automobile or truck being appreciably cooler when using this type of top material as compared with the usual black top material.

When the auto top material of the present invention is subsequently varnished or lacquered with a pigmented coating composition, the intermediate film of aluminum powder acts as a sealer coat and prevents oils and other softeners of the rubber composition from migrating to the surface film. This function of the aluminum powder film prevents the dulling and more or less rapid failure of the pigmented surface film encountered heretofore in attempting to use a pigmented coating composition, other than a black coating composition over the rubber coated top material. The subsequently applied varnish or lacquer shows a durability comparable to that of a similar composition applied to metal or wood. The auto top material of the present invention, of course, retains the flexibility and similar advantageous properties of the heretofore known flexible type auto top material.

As many apparently widely different embodiments of this invention may be made without departing from the spirit and scope thereof, it is to be understood that the invention is not limited to the specific embodiments thereof except as defined in the appended claims.

I claim:

1. As an article of manufacture, auto top material comprising a rubber coated fabric base and superposed thereon a varnish film comprising an oil modified polyhydric alcohol-polybasic acid resin and aluminum powder, said powder being present in amount equivalent to approximately 25 per cent by weight of the total solids in said varnish film.

2. A pliant article of manufacture comprising at least one layer of fabric having a coating of rubber on one exposed surface thereof, and a layer of cured varnish composition on the rubber, said varnish composition containing an amount of aluminum powder sufficient to form a sealer coat to prevent migration therethrough of oils and softeners contained in the rubber.

3. A pliant article of manufacture comprising at least one layer of fabric having a coating of rubber on one exposed surface thereof, and a layer of cured polyhydric alcohol-polybasic acid resin type varnish composition on the rubber, said varnish composition containing an amount of aluminum powder sufficient to form a sealer coat to prevent migration therethrough of oils and softeners contained in the rubber.

4. A pliant article of manufacture comprising at least one layer of fabric having a coating of rubber on one exposed surface thereof, and a layer of cured varnish composition on the rubber, said varnish composition containing aluminum powder in amount equivalent to about 25% by weight of the total solids in said varnish film.

5. A pliant article of manufacture comprising a plurality of fabric sheets cemented together with rubber cement, a coating of rubber on the exposed surface of one of the sheets, and a layer of cured varnish composition on the rubber, said varnish composition having a content of aluminum powder sufficient to form a sealer coat to prevent migration therethrough of oils and softeners contained in the rubber.

RUSSELL MORGAN.